Jan. 26, 1926.  
F. L. WERTZ  
DISPLAY DEVICE FOR ADVERTISEMENTS  
Filed Sept. 18, 1924

1,570,656

Inventor  
F. L. Wertz  
By his Attorney

Patented Jan. 26, 1926.

1,570,656

UNITED STATES PATENT OFFICE.

FREDERICK L. WERTZ, OF MONTCLAIR, NEW JERSEY.

DISPLAY DEVICE FOR ADVERTISEMENTS.

Application filed September 18, 1924. Serial No. 738,495.

*To all whom it may concern:*

Be it known that FREDERICK L. WERTZ, a citizen of the United States, residing at Montclair, in the county of Essex and State of New Jersey, has invented certain new and useful Improvements in Display Devices for Advertisements, of which the following is a specification.

This invention relates to display devices for advertisements, and more particularly to a device adapted for the mounting of advertising signs or posters of various sizes.

It is the object of this invention to provide a simple and inexpensive device of the above mentioned character and one that may be readily adapted for the display of signs of various sizes. Furthermore, it is the object of the present invention to provide simple and inexpensive means by which advertising signs may be readily mounted on a device of the above mentioned character.

The invention will be more fully understood from the following detailed description of preferred embodiments thereof.

Figure 1:
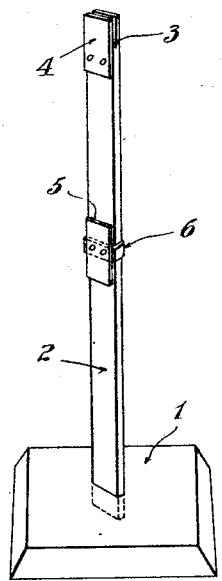
Figure 2:
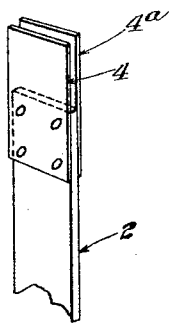
Figure 3:
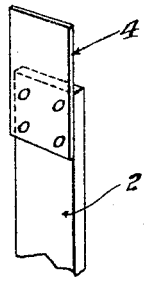
Figure 4:
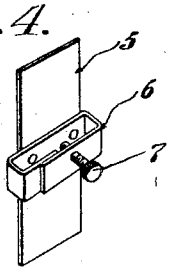
Figure 5:
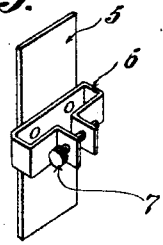

In the drawings, Fig. 1 is a perspective view of the mounting structure for advertising sign displays; Figs. 2 and 3 are modifications of the upper end of the mounting structure; Fig. 4 is a rear view of the movable clamp illustrated in Fig. 1; Fig. 5 is a similar view of a modified clamp; Figs. 6, 7, 8 and 10 are rear views of advertising signs adapted to be mounted on the structure shown in Fig. 1; and Fig. 9 is a sectional view along lines 9—9 of Fig. 8.

The mounting structure constructed in accordance with the present invention comprises a base 1 to which is attached the lower end of an upright 2 by any suitable means, e. g., by being wedged in a notch provided in the base. The upper end of the upright 2 is cut away, as shown at 3, and has fastened thereto by means of screws or the like, a thin holding member or finger 4. Instead of the arrangement illustrated in Fig. 1, the holding member or finger may be attached to the upper end of the upright 2 also in the manner illustrated in Fig. 3, or two such holding members 4 and 4ª may be attached to the upper end of the upright 2 in the manner illustrated in Fig. 2. Another holding member or finger 5 is fastened near its center to a sleeve 6 surrounding the upright 2 and adapted to be held in position by means of a thumb screw 7 engaging the upright 2. Instead of the arrangement disclosed in Fig. 4, the ends of the sleeve 6 may be bent back as shown in Fig. 5, and when placed under tension by the screw 7, will grasp upright 2 to prevent displacement of finger 5.

Figure 6:
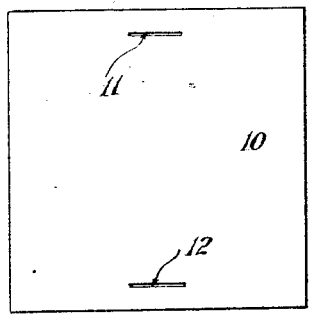
Figure 7:
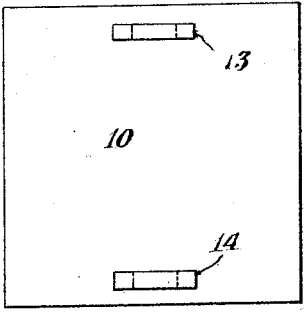

By means of the stationary and movable fingers or holding members 4 and 5, an advertising sign 10 may be held on the mounting structure against vertical and horizontal displacement. The manner in which the clamping members engage the advertising sign may be varied within wide limits, a few of the variations being disclosed in Figs. 6, 7, 8 and 10. As shown in Fig. 6, two slots 11 and 12 may be provided in the advertising sign near the upper and lower edges thereof. The slots 11 and 12 are of the proper width to slip over fingers 4 and 5. First, the sign 10 is hung on the stand by passing the finger 4 through slot 11, then the sleeve 6 is pushed down until the lower end of finger 5 passes through slot 12, and when the sign 10 is held taut, the screw 7 is tightened to fix the sleeve 6 in place.

Instead of providing slots in the advertising sign, such slots may be provided in a backing for the sign. The backing may entirely cover the back of the sign, or it may be provided in the form of two strips of cardboard or the like 13 and 14 (Fig. 7), which are pasted near their ends to the sign 10. The fingers 4 and 5 may now be used to hold the sign by passing between the strips 13 and 14 and the rear of the sign 10, as indicated in dotted lines in Fig. 7.

Figure 8:
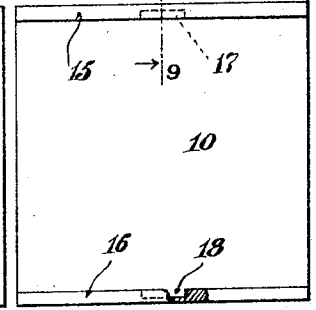
Figure 10:
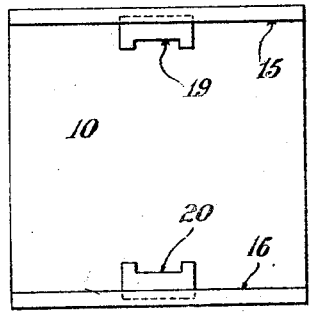
Figure 9:
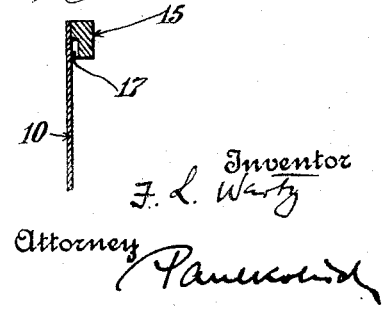

If, for the purpose of facilitating shipping of the sign it is not desired to print or paste it on cardboard backing, then the upper and lower edges thereof may be provided with heavy borders 15 and 16 of wood, cardboard, metal, or the like, in the manner illustrated in Figs. 8 and 9. In this case, at the center of the sign 10, the borders 15 and 16 are slotted, as indicated at 17 and 18, the slots being engaged respectively by the two fingers 4 and 5.

Similarly, the upper and lower heavy borders 15 and 16 may clamp against the sign 10 the upper edges of pieces of cardboard, metal, or the like, 19 and 20 (Fig. 10) adapted to engage the two fingers 4 and 5.

The mounting structure forming the object of the present invention may be used for holding advertising signs of varying shapes and sizes at a sufficient height to attract attention if displayed in a show window. No special means beyond the provision of two slots or similar openings in the advertising sign or in the backing thereof, need be provided for rigidly holding it against displacement, and the arrangements disclosed in Figs. 8 to 10 make possible the use of inexpensive and easily handled signs with substantially the same effect as though they were pasted on cardboard. The mounting structure is preferably constructed of wood and its base may or may not bear advertising inscriptions. It is light, may be moved around to a suitable place in a show window or store, and its adjustment and assembly may be simply and inexpensively effected.

What I claim is:

1. In a mounting structure for displaying advertisements, an advertising sign, reinforcement therefor, a stationary and a movable finger on said structure, said movable finger being adapted for displacement with respect to said stationary finger, and two openings in said reinforcement one near the upper and the other near the lower end of the sign, said openings registering with said fingers to hold the sign against lateral and vertical displacement.

2. In a mounting structure for displaying advertisements, a stationary finger on said structure, a finger movable on said structure with respect to said stationary finger, an advertising sign on a sheet of relatively pliable material, two relatively stiff borders for said sign, and slots in said borders with which said fingers register.

In testimony whereof, I have signed my name to this specification this 16th day of September, 1924.

FREDERICK L. WERTZ.